United States Patent [19]

Rochlin

[11] 4,247,586
[45] Jan. 27, 1981

[54] NOISE REDUCING LINER PANELS FOR VEHICLES

[76] Inventor: Morris Rochlin, 1220 Morse St., Royal Oak, Mich. 48068

[21] Appl. No.: 57,907

[22] Filed: Jul. 16, 1979

[51] Int. Cl.³ .............................................. B32B 5/18
[52] U.S. Cl. .................................. 428/138; 156/222; 156/252; 156/293; 181/284; 181/288; 181/DIG. 1; 428/174; 428/315
[58] Field of Search .............. 428/137, 138, 313, 315, 428/159, 160, 172, 173, 174, 161–163, 157, 177; 181/284, 288, DIG. 1; 156/222, 252, 293

[56] References Cited

U.S. PATENT DOCUMENTS

| | | | |
|---|---|---|---|
| 4,073,991 | 2/1978 | Focht | 428/159 |
| 4,092,200 | 5/1978 | Nomura et al. | 428/313 |
| 4,119,749 | 10/1978 | Roth et al. | 428/160 |
| 4,128,682 | 12/1978 | Nomura et al. | 428/315 |
| 4,128,683 | 12/1978 | Nomura et al. | 428/315 |
| 4,129,672 | 12/1978 | Nomura et al. | 428/315 |
| 4,172,918 | 10/1979 | Doerer | 428/315 |

Primary Examiner—William J. Van Balen
Attorney, Agent, or Firm—Cullen, Solman, Cantor, Grauer, Scott & Rutherford

[57] ABSTRACT

A noise reducing liner panel, such as a headliner and interior panel, and the like for motor vehicles, formed of a lamination of a substantially rigid, plastic sheet, a thin, flexible, foam plastic layer, and an outer fabric covering, all bonded together while flat. Numerous, small, closely spaced perforations are formed in pre-determined areas in the rigid sheet before laminating. The initially flat, rigid sheet is permanently bent and distorted, after the bonding, into predetermined cross-sectional contours and shapes, including forming relatively deep depressions in the uncovered surface of the rigid sheet, at pre-selected areas, which depressions include areas of perforations. The depressions may be filled with sound absorbing materials, such as pieces of foam plastic, for thereby forming selected panel areas with greater sound absorbing capacity. The holes, including unsightly hole distortions as may be caused by the deforming step, are concealed from view by the foam plastic layer and fabric to thereby provide an asthetically pleasing interior panel surface.

7 Claims, 8 Drawing Figures

NOISE REDUCING LINER PANELS FOR VEHICLES

BACKGROUND OF INVENTION

It is common to line the interior wall surfaces and ceiling surfaces of the passenger compartments of motor vehicles with panels formed for noise reduction or sound-proofing and also to provide a pleasing asthetic appearance. Although such linings have been used in automobiles for a considerable period of time, it has only been recently that efforts have been made to provide suitable noise reduction liners within the operator or passenger compartments of other types of motor vehicles, such as tractors, larger trucks, construction equipment of various types, and various types of farm implement equipment and the like.

In construction and farm equipment, including tractors, generally it is more difficult to form appropriate sound reduction liners for the operator's compartment than it is for the interior of automobiles. Part of the problem is that there is a greater noise level and less wall space to soundproof in such equipment.

Moreover, in the larger types of motor vehicle equipment, because the operator spends a considerable portion of his working time within the compartment, it is desirable to make the liner panels asthetically pleasing. Further, in many larger vehicles, it is desirable to increase the sound-proofing in certain portions of the compartment as compared to other portions of the compartment. Thus, greater sound-proofing effects may be wanted within certain portions of the headliner or one or another of the interior panels than other areas of the liners.

Hence, the invention herein is concerned with improving the methods and products used for lining panels for the interior of motor vehicle compartments, particularly for the larger types of vehicles such as construction equipment, farm implement equipment and the like type of vehicles.

SUMMARY OF INVENTION

The invention herein contemplates forming sound reduction panels out of a lamination of a substantially rigid plastic base sheet, to which is bonded a flexible foam plastic layer upon which is bonded an interior fabric covering. The base sheet is perforated, while flat, in preselected areas where sound reduction is desired, before bonding. The bonding of the three elements together takes place while the sheet is flat. Once the bonding is completed, the sheet is then deformed, such as by heat and pressure, into a finished shape for insertion within the vehicle to cover a particular wall portion or the ceiling as a headliner.

The invention contemplates that the deformation of the laminated elements can be of sufficient depth at selected locations, so as to form channels or receptacle or dished areas, within which additional sound reducing materials may be inserted such as fillers of blocks or pieces of foam plastic material which will then be positioned between the liner and the support wall surface at the selected depression areas.

One of the problems arising in forming perforated substantially rigid plastic sheet liners is that if the perforations are made before the deformation of the sheet, the perforations tend to distort, such as by elongating or the like, so that to the viewer's eye, the pattern of holes is unsightly. Alternatively, perforating after the deformation is a much more difficult and expensive task, requiring expensive equipment.

Consequently, the invention herein contemplates perforating the rigid plastic base sheet while it is flat, and then eliminating the unsightly appearance problem because of hole distortion during deformation of the sheet by relying upon the foam plastic layer and the covering fabric to bridge over or cover all of the perforations and thereby conceal them from view.

One object of the invention herein is to provide a relatively large size liner panel which may be handled as a unit to cover an entire wall surface or form a complete headliner for the cab or operator's compartment or passenger's compartment of a motor vehicle, including large construction equipment, farm vehicles such as tractors, and the like, etc., which liner functions both as sound attenuating means as well as to improve the asthetic appearance of the covered wall surfaces. The panel, formed according to the following disclosure, is relatively inexpensive to produce, that is, not requiring overly complex or expensive production machinery.

These and other objects and advantages of this invention will become apparent upon reading the following description, of which the attached drawings form a part.

DETAILED DESCRIPTION

Figure 1:
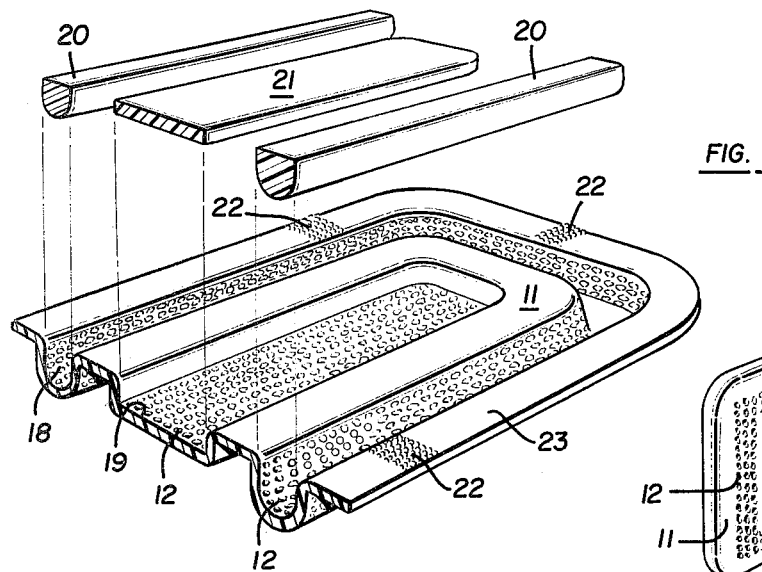
FIG. 1 is a perspective, fragmentary view of a portion of a vehicle headliner which is contoured or shaped to provide depressions to receive fillers for increased sound attenuation.

The liner panel may be formed in the required peripheral and surface contour to sit over and cover the interior wall-like surface of the motor vehicle or the structure to be lined. Thus, the panel may be formed in the shape of a headliner which fits within a cab or operator compartment or passenger compartment and covers the interior surface of the ceiling. Alternatively, it may be shaped as a door panel cover or an interior cover for other portions of the structure, such as around the seats in a construction equipment cab, or the like. Thus, to summarize, the shape and size of the panel will vary depending upon the particular application. The disclosure herein for illustrative purposes, shows a particular shape and form. However, it is to be understood that the size, shape and contouring or cross-sectional configuration will vary.

Referring to the drawings, the liner panel, generally designated 10, includes a substantially rigid, monolithic plastic sheet 11. The particular plastic composition may vary, depending upon commercial availability and structural integrity for the purpose intended. By way of example, the suitable commercially available so-called "ABS" plastic or "Amocor", a rigid styrene foam which can be formed, made by Amoco Oil Company, of sufficient thickness to maintain substantial rigidity or stiffness has been found to be satisfactory for some uses. Preferably, a low oriented or annealed or stress relieved sheet should be used.

Figure 2:
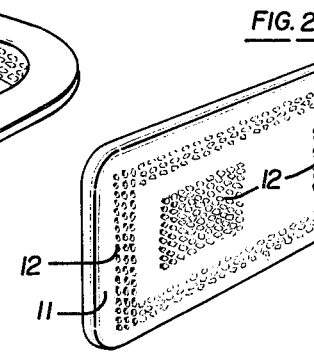
FIG. 2 is a perspective view of a flat, rigid base sheet showing perforated areas.

The sheet 11 is provided with numerous, closely spaced, relatively large perforations 12 located in predetermined areas, as illustrated in FIG. 2 which shows the sheet in flat form with areas of perforations 12.

Figure 3:
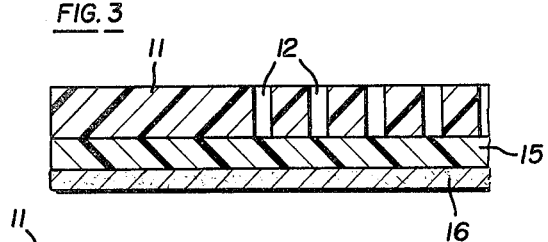
FIG. 3 is an enlarged fragmentary cross-sectional view showing the panel lamination.
Figure 4:
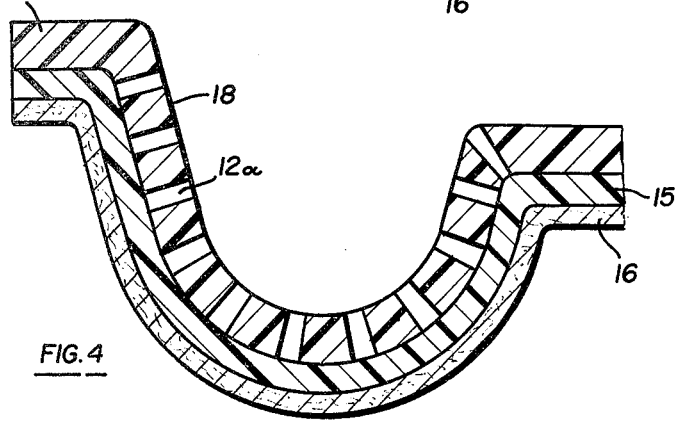
FIG. 4 is an enlarged, cross-sectional view showing a fragment of a depressed portion of the panel.

As shown in FIGS. 3 and 4, the rigid plastic sheet is covered with a flexible, foam plastic layer 15, which in turn is covered with a fabric 16. The fabric is bonded to the foam plastic layer first, then the laminate of the two is bonded to the rigid plastic sheet, in a manner to be described.

The bonding or assembly of the three elements, i.e., rigid plastic sheet 11, foam plastic layer 15 and fabric 16 is accomplished in the flat state. Once the three are assembled into a laminate form, by means of suitable pressure and heat, depressions are formed in the panel in the shape of relatively deep grooves 18, dished areas 19 and the like, of predetermined depths and lengths and widths.

The depressions, depending upon predetermination as to areas of increased sound resistance, may be filled with sound attenuating fillers 20 and 21 (see FIG. 1).

The shape or contoured or depressed liner panels are applied against the supporting structure or support wall and may be secured thereto by mechanical fasteners or simply by use of so-called "velcro" type of looped fabric materials which permit application and removal of the panels when desired. Thus, FIG. 1 shows, by way of illustration the location of "velcro" type patches 22 along a rim 23 formed on the panel.

The foam plastic layer should be of a flexible material which is commercially available and suitable for installation within a vehicle. Various types of polyurethanes, polyethylenes and the like materials are available. The particular material selected is within the discretion of a designer.

The fabric covering 15, however, should be of a stretchable material so that when it is applied flat to the rigid plastic sheet, it will then deform and conform to the contours of the panel forming sheet. One suitable form of such material is a commercially available two-way or four-way stretch-type nylon cloth which is formed of stretchable nylon threads that are knitted together into a stretch resulting sheet. Other woven types of materials which are stretchable would suffice likewise. Thus, a stretchable material is desirable, although the particular technique utilized for forming the material is not significant. That is, the material referred to here may be woven, knit or even non-woven, so long as it produces the stretch function.

Likewise, the foam plastic layer 15 should be of material which will substantially conform to and stretch around the shaped contours formed from the flat lamination to the shaped panel configuration. The shaping should not overly thin any particular area of the layer, but rather the layer should give or move sufficiently to keep it at a relatively uniform thickness, although some thinning is inevitable at stretch points.

Figure 8:
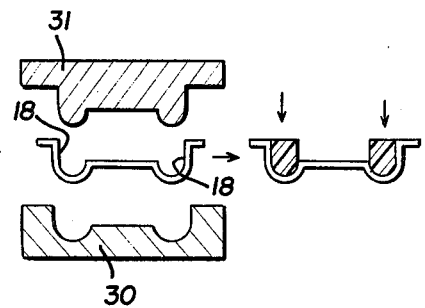
FIG. 8 is a schematic view showing the successive steps in the production of the panel.

The method of forming the panel is schematically illustrated in FIG. 8 as follows: the flexible foam plastic layer 15 and the fabric 16 are brought together and laminated or bonded. Next, the lamination of the foam layer and fabric is bonded to the inner (i.e., relative to the wall to be covered) surface of the rigid sheet 11. The rigid sheet 11 has already been perforated in those areas required.

Next, the flat lamination is placed within a suitable piece of forming equipment including a lower die 30 and an upper die 31 with appropriate cavities and shapes and upon the application of such heat and pressure as may be required, utilizing conventional die or pressing techniques, the panel is shaped and depressed as required. Alternatively, a sag forming or vacuum forming process may be used. Because of the covering over the perforated sheet 11, vacuum forming is possible. Both of these processes are conventional.

Next, the panel is removed and positioned upon the wall surface where it is to be used. Before doing so, however, selected depressions may be filled with the suitable sound attenuating filler. This provides special sound attenuation in selected areas, such as areas around and above the operator's head in a piece of construction equipment, etc.

Figure 5:
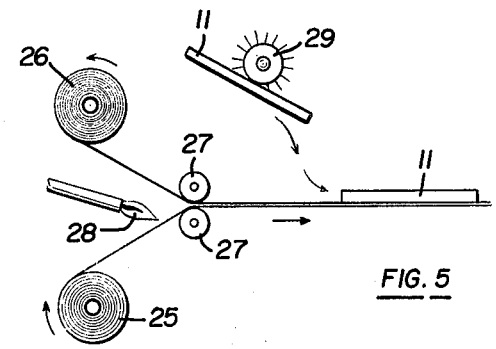
FIG. 5 is a schematic view of the equipment for producing the panel.

FIG. 5 schematically illustrates equipment for performing the lamination or bonding. Thus, the Figures illustrates a roll of flexible foam layer sheeting of predetermined suitable thickness as for example, one quarter of an inch or so, designated by the number 25. Below that is a roll of a woven or knitted stretch nylon fabric 26. Guide rollers 27 bring the layer and the fabric together after a conventional flame heater 28 which provides sufficient heat to the foam plastic to melt the foam sufficiently to bond the two sheets together.

Meanwhile, the flat rigid plastic sheet 11 is run through a perforater roller 29 to provide the perforations in the areas desired. That area may include all, or selected areas or portions of the sheet. It is important that the sheet is formed of a material which will not curl or buckle upon being perforated as some plastics tend to do.

The now perforated sheet 11 is applied to the surface of the layer which bonds to it by using suitable solvents or adhesives or a flame heater. In whatever manner the bonding takes place, the intention is to use commercially available equipment and techniques for simplicity and cost reduction.

When the laminated panel is formed and is then deformed in the dies or press, the perforations or holes 12 tend to deform, as illustrated by reference numeral 12a in FIG. 4, so that in some areas, the holes remain round and in other areas they are elongated or otherwise misshaped. If the rigid sheet were exposed to view, the end result would be an unsightly appearance due to the various forms and formations of holes. This actually occurs where such rigid plastic sheets are used alone for headliner purposes in vehicles.

However, because the rigid sheet is covered with the layer 15, and in turn by the fabric 16, the distorted holes are concealed from view. The layer and fabric suitably stretch and conform to the mis-shapen holes and the material surrounding the holes so that there is no telescoping or indentation of the holes through the fabric.

Figure 6:
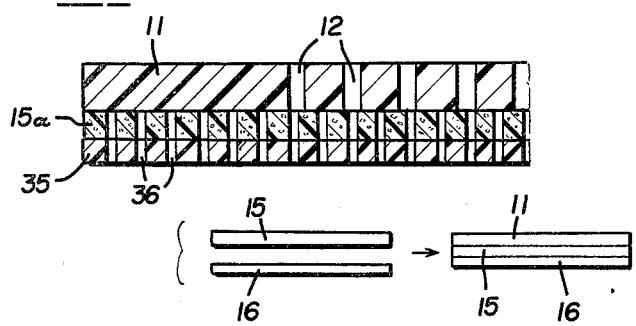
FIG. 6 is an enlarged, fragmentary view, similar to FIG. 3, but showing a modified form of the liner.

FIG. 6 illustrates a modified form of panel which utilizes a different fabric. That is, the modified panel includes the same rigid plastic sheet 11 as described above, with the same perforations 12. However, the foam plastic layer 15a is covered with an imperforate plastic sheet 35, such as a flexible vinyl plastic sheet. Thereafter, the lamination is perforated through both the fabric and the layer with numerous small perforations 36 (see FIG. 6). These small perforations 36 need not be aligned with the larger holes 12 in the rigid sheet but can appear wherever they haphazardly happen to appear without affecting the function of the panel. This considerably simplifies the construction and the technique of manufacturing the product.

Figure 7:
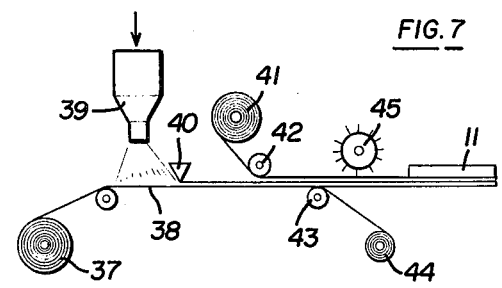
FIG. 7 is a schematic view, similar to FIG. 5, showing the production of the modified panel of FIG. 6.

Referring to FIG. 7, the production of the imperforate plastic sheet fabric type panel is shown schematically. Thus, a roll 37 of sheet forming release paper 38 receives a plastic deposit from a casting nozzle 39 of the imperforate sheet forming plastic material, such as a vinyl. The conventional blade 40 spreads out the plastic, which solidifies into a sheet form. Meanwhile, a layer of foam plastic from a roll 41 is guided by means of a guide roll 42 on the surface of the plastic sheet for bonding thereto.

The release paper is removed around the guide roller 43 and then rewound around a rewind roller 44.

The lamination of the foam plastic layer and imperforate sheet pass beneath perforating rollers, schematically shown at 45 and then the layer is bonded to the already perforated, flat, rigid plastic sheet 11. From that point on, the composite lamination is suitably pressed or formed into the final shape and contour as described above.

The complete panel, when fastened in place upon a supporting wall structure, gives the appearance of relatively luxurious fabric interior lining where the knit stretch fabric is used or alternatively an attractive, modern appearance where the finely perforated vinyl is used. This substantially improves the asthetic effect of the interior of an operator's compartment, passenger compartment, or the like of a vehicle. Moreover, the sound-proofing or sound attenuation is substantially improved, as well as localized, as desired.

Having fully described an operative embodiment of this invention, I now claim:

1. A method of forming a noise reduction liner panel for a wall-like support surface, such as a headliner and an interior panel liner for the interior surfaces of a motor vehicle, comprising essentially the steps of:
   forming a substantially rigid, flat sheet of plastic material of a pre-determined size and shape to form the panel, including perforating the sheet with numerous, small, closely spaced holes extending therethrough, in predetermined areas which are selected for noise reduction;
   bonding to the sheet a laminate formed of a flexible foam plastic layer bonded with a fabric covering, with the fabric bonded to one face of said layer and the opposite face of the layer bonded to one face of said sheet, to form a flat, composite panel wherein the fabric forms the interior, exposed surface of the panel, and the sheet opposite, uncovered, face forms the panel outer face for subsequent application against said wall-like support surface;
   thereafter, permanently deforming the flat composite panel into pre-determined cross-sectional shapes, whereby the laminate conforms to the deformed shapes and particularly covers over and bridges the holes so that any holes which are distorted in the deforming of rigid sheets are concealed from view by the laminate;
   forming at least some of the deformed shapes of the composite panel into relatively deep depressions relative to the panel outer face, and filling said depressions with sound absorbing fillers, for thereby providing increased sound absorption at the filled areas of the panel.

2. A method as defined in claim 1, and including said depressions being formed in perforated portions of said sheets.

3. A method as defined in claim 2, and including forming said laminates by bonding together a stretchable cloth fabric formed of threads processed into cloth such as by knitting to provide stretchability, and a relatively thicker, flexible foam plastic sheet, wherein the laminate conforms to the deformations formed in the flat composite panel, without substantial changes in cross-sectional thickness of the laminate.

4. A method as defined in claim 2, and including forming said laminates by bonding together a thin, imperforate, flexible, plastic sheet and a relatively thicker, foam plastic sheet;
   then perforating the laminate with numerous small holes over substantially its entire surface;
   and thereafter, bonding the laminate to the rigid sheets.

5. A noise reduction liner panel for applying upon a support surface, such as a headliner and an interior panel for application upon interior surfaces of a motor vehicle, comprising:
   a substantially rigid, relatively thin sheet of plastic material which is surface contoured to pre-determined cross-sectional shapes and whose peripheral edge is of pre-determined shape for application upon a support surface, with the sheet having an outer face arranged at the support surface, and an inner face;
   numerous perforations formed through the sheet in predetermined areas, for sound absorption;
   said sheet inner face being covered with a relatively thin layer of a flexible foam plastic material which in turn is covered with a thin, flexible fabric, with the fabric being bonded to the foam plastic layer, which is bonded to said sheet inner face, so that the fabric forms the interior, exposed surface of the panel;
   said panel being permanently deformed in pre-selected shapes including areas of depressions which extend inwardly of the panel relative to the rigid sheet outer face;
   with the depressions formed in said perforated areas;
   and said depressions being filled with separate sound absorbing material members;
   whereby the fabric covered inner surface of the panel presents a pleasing asthetic appearance, while the holes in the sheet, particularly where any of such holes are distorted in shape, relative to other of such holes, are concealed from view, and the sound absorbing characteristics of the panel are increased in the perforated areas.

6. A liner panel as defined in claim 5 and said fabric being formed of a stretchable cloth made of thread and produced by a process, such as knitting, to provide stretchability for the cloth, which cloth conforms to the surface shape of the panel.

7. A liner panel as defined in claim 5, and said fabric being formed of a thin, originally imperforate, flexible plastic sheet, which is bonded together with a foam plastic layer and with numerous, small perforations, formed through the bonded together flexible plastic sheets and foam plastic layer before bonding the layer to the rigid plastic sheet, so that the perforation of the rigid plastic sheet and of bonded foam plastic layer-fabric sheet are not necessarily aligned.

* * * * *